E. P. & A. J. PIERCE.
KNOCKDOWN STOOL.
APPLICATION FILED SEPT. 7, 1909.
983,458.
Patented Feb. 7, 1911.
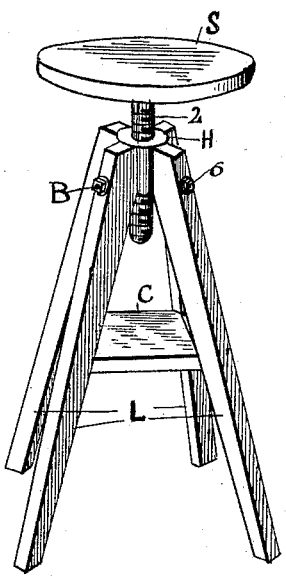
Fig. 1.
Fig. 2.
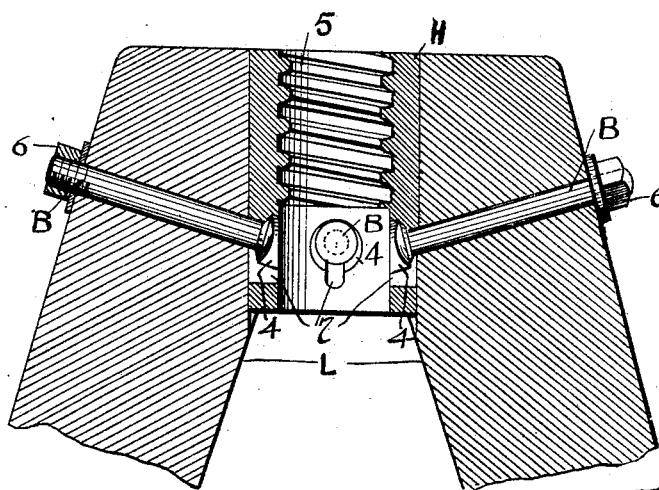
Fig. 3.
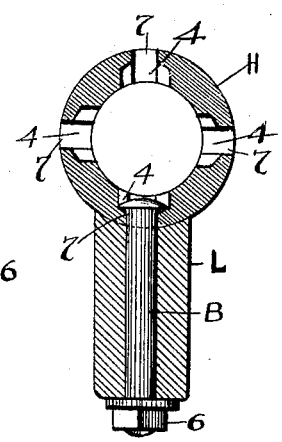
ATTEST
E. M. Fisher
J. C. Mussun
INVENTOR
ERNEST P. PIERCE.
ARTHUR J. PIERCE.
By Fisher & Moore, ATTYS.

UNITED STATES PATENT OFFICE.

ERNEST P. PIERCE AND ARTHUR J. PIERCE, OF LORAIN, OHIO; SAID ARTHUR J. PIERCE ASSIGNOR TO SAID ERNEST P. PIERCE.

KNOCKDOWN STOOL.

983,458.   Specification of Letters Patent.   Patented Feb. 7, 1911.

Application filed September 7, 1909. Serial No. 516,432.

*To all whom it may concern:*

Be it known that we, ERNEST P. PIERCE and ARTHUR J. PIERCE, citizens of the United States, residing at Lorain, in the county of Lorain and State of Ohio, have invented certain new and useful Improvements in Knockdown Stools, of which the following is a specification.

Our invention relates to a knock-down stool having an adjustable seat, and the invention consists in the construction of the stool with parts arranged and adapted to work substantially as shown and described and particularly pointed out in the claim.

In the accompanying drawings, Figure 1 is a perspective view of our new and improved stool. Fig. 2 is a vertical sectional elevation thereof considerably enlarged as compared with Fig. 1 and representing portions of two of the legs and a section of the hub or socket with which the legs are connected by bolts. Fig. 3 is a plan view of one of the legs and the hub on a section line corresponding to the bolt connecting the leg and hub.

In the stool as thus shown S represents the seat, which is provided with a screw threaded spindle 2 adapted to be run up and down in the threads of hub H as is now well known in adjustable stools of this general character.

L represents the four several legs of the stool and which are shown as connected by a suitable flat piece C interposed about half way their length and serving as a shelf as well as a brace. Either this particular style of cross piece and brace or some other suitable one may be used, but the flat form shown is preferred because it serves as a shelf upon which objects may be placed and is held in place by screws 3 in the angles with the legs.

The invention resides, first, in the construction of the hub H, and this is designed to be used with relatively straight wooden legs L and bolts B as shown. The said legs are shown as slightly heaviest at their upper ends and are cut at a bevel across the inside of said ends and rounded transversely in said bevel so as to conform to the surface of the hub H and at the same time give the legs the right inclination and spread outward to provide a firm support for the stool.

Now, in order that the parts may be united as shown, the hub H is specially constructed with recesses 4 in its lower portion which retires the inner surfaces thereof sufficiently far behind the screw threads 5 to make room for screw 2 inside the hub as related with the heads of bolt B. It will be particularly observed that the heads of bolts B are inside the hub and not outside, because it is desirable to have the nuts 6 where they are easily approached for assembling or separating the stool. Hence the importance of said recesses 4 in which said heads are retired and vertical slots 7 are provided in the said recesses through which the bolts B are adapted to be inserted from beneath, or through the bottom opening of the hub, and moved up into locking position in the legs L.

It is found necessary in a stool made after the present pattern to set the bolts B at an inclination to the axis of the hub in order that they may go squarely through the legs L and hold the legs at said bevel, and hence the parts are assembled by first passing a bolt through one of the said slots 7 from the inside outward and then engaging a leg L therewith and finally fastening the nut 6 thereon. All the four legs are secured in this way, and altogether an exceedingly firm and comparatively simple and cheap construction is produced. The shelf brace C is secured to the legs by said screws 3 through recesses 9 cut in the said brace and from which the said screws can be withdrawn.

In some instances, we may prefer to use a straight or unthreaded spindle 2, but hub H would not be changed in this event except for the omission of threads 5.

What we claim is:

A knock-down stool having a tubular hub threaded internally and provided with a plurality of radially disposed slots lengthwise thereof through its lower end beneath the thread therein and recesses inside over the upper portions of said slots, in combination with legs for said stool having beveled upper ends resting against said hub over said slots and bolts securing said legs in place entered through said slots and having their heads in said recesses, nuts on the outer ends of said bolts bearing against the outside of said legs and a rigid brace between the middle of said legs and removably engaged therewith.

In testimony whereof we affix our signatures in presence of two witnesses.

ERNEST P. PIERCE.
ARTHUR J. PIERCE.

Witnesses:
  A. C. CALHOON,
  C. W. PURCELL.